United States Patent
Miyazaki

(10) Patent No.: US 11,458,768 B2
(45) Date of Patent: Oct. 4, 2022

(54) RUBBER COMPOSITION FOR TREAD, AND PNEUMATIC TIRE

(71) Applicant: Sumitomo Rubber Industries, Ltd., Hyogo (JP)

(72) Inventor: Tatsuya Miyazaki, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 240 days.

(21) Appl. No.: 16/627,945

(22) PCT Filed: May 23, 2018

(86) PCT No.: PCT/JP2018/019780
§ 371 (c)(1),
(2) Date: Dec. 31, 2019

(87) PCT Pub. No.: WO2019/017067
PCT Pub. Date: Jan. 24, 2019

(65) Prior Publication Data
US 2021/0023882 A1    Jan. 28, 2021

(30) Foreign Application Priority Data

Jul. 19, 2017   (JP) .............................. JP2017-139988

(51) Int. Cl.
| | | |
|---|---|---|
| *C08L 9/06* | (2006.01) | |
| *C08L 93/04* | (2006.01) | |
| *C08K 3/36* | (2006.01) | |
| *C08K 3/06* | (2006.01) | |
| *C08K 5/36* | (2006.01) | |
| *C08F 36/06* | (2006.01) | |
| *C08F 8/42* | (2006.01) | |
| *B60C 1/00* | (2006.01) | |

(52) U.S. Cl.
CPC .............. B60C 1/0016 (2013.01); *C08F 8/42* (2013.01); *C08F 36/06* (2013.01); *C08K 3/06* (2013.01); *C08K 3/36* (2013.01); *C08K 5/36* (2013.01); *C08L 9/06* (2013.01); *C08L 93/04* (2013.01)

(58) Field of Classification Search
CPC ... B60C 1/00; C08L 9/06; C08L 93/04; C08K 3/36; C08K 3/06; C08K 5/36; C08F 36/06; C08F 8/42
USPC ........................................................ 523/156
See application file for complete search history.

(56) References Cited

U.S. PATENT DOCUMENTS

| | | | | |
|---|---|---|---|---|
| 5,396,940 A | * | 3/1995 | Segatta ................... | C08L 15/00 525/333.1 |
| 5,447,971 A | * | 9/1995 | Bergh ...................... | C08K 3/36 523/213 |
| 5,605,950 A | * | 2/1997 | Evans .................... | B60C 1/0016 524/495 |
| 5,610,221 A | * | 3/1997 | Waddell ................... | C08K 3/36 524/495 |
| 5,616,655 A | * | 4/1997 | D'Sidocky .............. | C08K 5/548 525/344 |
| 5,886,086 A | * | 3/1999 | Hubbell ................... | C08K 3/36 525/232 |
| 8,957,149 B2 | * | 2/2015 | Zhao ........................ | C08L 15/00 524/492 |
| 2003/0212185 A1 | * | 11/2003 | Vasseur ................. | B60C 11/005 524/492 |
| 2008/0121324 A1 | | 5/2008 | Cambon et al. | |
| 2010/0160513 A1 | * | 6/2010 | Sandstrom ............. | C08K 5/098 524/274 |
| 2012/0053286 A1 | * | 3/2012 | Zhao ......................... | C08L 7/00 524/517 |
| 2013/0165578 A1 | * | 6/2013 | Francik ................. | B60C 1/0016 524/516 |
| 2014/0155521 A1 | | 6/2014 | Miyazaki | |

FOREIGN PATENT DOCUMENTS

| | | |
|---|---|---|
| CN | 103732670 A | 4/2014 |
| EP | 0 767 206 A1 | 4/1997 |
| EP | 0 831 121 A1 | 3/1998 |
| EP | 0 877 047 A1 | 11/1998 |
| FR | 2 880 893 A1 | 7/2006 |
| JP | S60-158233 A | 8/1985 |
| JP | 10-101847 A | 4/1998 |
| JP | 2005-146076 A | 6/2005 |
| JP | 2008-527157 A | 7/2008 |
| JP | 2014-214266 A | 11/2014 |
| WO | 00/05301 A1 | 2/2000 |

OTHER PUBLICATIONS

International Search Report issued in PCT/JP2018/019780; dated Aug. 7, 2018.

* cited by examiner

*Primary Examiner* — Deve V Hall
(74) *Attorney, Agent, or Firm* — Studebaker & Brackett PC

(57) ABSTRACT

The present invention provides a tread rubber composition that is excellent in wet grip performance during the initial phase of running and tensile properties, and a pneumatic tire including the tread rubber composition. The present invention relates to a tread rubber composition containing: a diene rubber; silica; and sulfur and/or a sulfur-containing compound, the tread rubber composition satisfying the following relationships (1) to (3):

$EB/M300 \geq 50$    (1);

$M100 \geq 1.7$ MPa    (2); and $EB \geq 500\%$    (3).

6 Claims, No Drawings

RUBBER COMPOSITION FOR TREAD, AND PNEUMATIC TIRE

TECHNICAL FIELD

The present invention relates to a tread rubber composition and a pneumatic tire.

BACKGROUND ART

Breaking energy (TB×EB×0.5) expressed by tensile strength and elongation at break, or elongation at break (EB) is generally used as an indicator of cut and chip resistance of tires. For example, the following criterion is used: an EB of 450% or higher is considered to lead to good cut and chip resistance.

It is also thought that grip performance includes the following three factors: (1) hysteresis friction force, (2) traction force, and (3) actual contact area to the road surface. To measure the most contributing hysteresis friction force, techniques using viscoelastic properties of rubber, e.g., tan δ (especially for wet conditions) are generally used. A technique for measuring traction force is making use of the adhesion force of adhesive materials bleeding to the tire surface. It has been appreciated that traction force makes a contribution comparable to hysteresis friction force for racing tires under dry conditions. The actual contact area to the road surface has not been sufficiently studied. In particular, it is surmised that the actual contact area highly contributes to grip performance during the initial phase of running. Tan δ values at 20 to 100° C. and at −10 to 10° C. are used for dry and wet conditions, respectively. It is desirable to provide tires that are excellent in initial wet grip performance while taking into account the factors (1), (2), and (3), and indicators of such tires.

SUMMARY OF INVENTION

Technical Problem

The present invention aims to solve the problems and provide a tread rubber composition that is excellent in wet grip performance during the initial phase of running and tensile properties, and a pneumatic tire including the tread rubber composition.

Solution to Problem

The present invention relates to a tread rubber composition, including:
a diene rubber;
silica; and
at least one of sulfur or a sulfur-containing compound,
the tread rubber composition satisfying the following relationships (1) to (3):

$$EB/M300 \geq 50 \tag{1};$$

$$M100 \geq 1.7 \text{ MPa} \tag{2}; \text{ and}$$

$$EB \geq 500\% \tag{3}.$$

Preferably, the rubber composition satisfies the following relationships (1A) to (3A):

$$EB/M300 \geq 70 \tag{1A};$$

$$M100 \geq 2.0 \text{ MPa} \tag{2A}; \text{ and}$$

$$EB \geq 550\% \tag{3A}.$$

Preferably, the diene rubber includes at least one of a modified styrene-butadiene rubber or a modified polybutadiene rubber.

Preferably, the diene rubber includes an alkoxysilyl-modified styrene-butadiene rubber.

Preferably, the rubber composition contains at least one of a sulfur-containing oligomer or a rosin resin.

The present invention also relates to a pneumatic tire, including a tread that includes the rubber composition.

Preferably, the rubber composition contains at least one of a sulfur-containing oligomer or a rosin resin.

The present invention also relates to a tire, including a tread, at least part of the tread satisfying the following relationships (1) to (3):

$$EB/M300 \geq 50 \tag{1};$$

$$M100 \geq 1.7 \text{ MPa} \tag{2}; \text{ and}$$

$$EB \geq 500\% \tag{3}.$$

Advantageous Effects of Invention

The tread rubber composition of the present invention includes a diene rubber, silica, and sulfur and/or a sulfur-containing compound, and satisfies the relationships (1) to (3). Such a tread rubber composition can provide a pneumatic tire that is excellent in wet grip performance during the initial phase of running and tensile properties.

DESCRIPTION OF EMBODIMENTS

The tread rubber composition of the present invention includes a diene rubber, silica, and sulfur and/or a sulfur-containing compound, and satisfies the following relationships (1) to (3):

$$EB/M300 \geq 50 \tag{1};$$

$$M100 \geq 1.7 \text{ MPa} \tag{2}; \text{ and}$$

$$EB \geq 500\% \tag{3}.$$

With these features, it is possible to provide excellent wet grip performance during the initial phase of running, tensile properties, cut and chip resistance, and handling stability.

The significance of parameters represented by relationships (1) to (3) (i.e., the mechanism causing the effects) is believed to be as follows.

As mentioned earlier, elongation at break (EB) is used as an indicator for various properties. However, there is no technique using a ratio of elongation at break (EB) to 300% modulus (M300). A low M300 means a low resistance at 300% elongation, i.e., being easily deformable with a small force. Thus, the actual contact area of the tread surface to the road surface is considered to increase. On the other hand, it is considered that a high M300 leads to an image of a hard tire being placed on a pin frog (flower holder) and thus to a decrease in actual contact area. For example, during the initial phase of running of tires, the temperature of the tires is as low as about the environmental temperature, and usually the rubber hardly makes a contact with the micro-irregularities of road surface aggregates. Thus, grip performance derived from the adhesion between the rubber and the road surface is difficult to obtain. However, reducing M300 is believed to increase the actual contact area and adhesion force, thereby contributing to improvement in initial grip.

It is also considered that a high EB provides excellent tensile properties and therefore cut and chip resistance, and a high 100% modulus (M100) results in good handling stability. As described above, it is believed that when a rubber composition has EB and M100 satisfying relationships (2) and (3) and further satisfies relationship (1), especially by reducing M300, it has a large actual contact area which provides excellent wet grip performance during the initial phase of running (overall wet grip performance during the initial phase of running, including linear grip, cornering grip, grip during rapid steering for danger avoidance, and rate of deceleration during hard braking, based on the driver's subjective evaluation of grip).

In contrast, simply reducing Hs (or M100) allows the rubber to easily follow micro deformation, but may cause large leaning deformation of the rubber to keep a part of the rubber apart from the surface during cornering, thereby diminishing the area-increasing effect. Therefore, it is not suitable as an indicator of wet grip performance during the initial phase of running.

Relationships (1) to (3) may be satisfied by, for example: (a) a method using a modified styrene-butadiene rubber for silica and/or a modified polybutadiene rubber for silica; (b) a method using a sulfur-containing oligomer as sulfur (vulcanizing agent); (c) a method using a highly dispersible resin (aromatic modified terpene resin, coumarone-indene resin, etc.) as resin; (d) a method using a rosin resin that allows for uniform crosslinking with sulfur; or (e) a method using silica as a main filler while increasing the filler content (e.g., a silica content of 95 parts by mass or higher and a filler content of 37% by mass or higher based on 100% by mass of the total amount of the rubber composition). These methods may be used alone or in combination.

The reason why relationships (1) to (3) can be satisfied by the methods (a) to (e) is believed to be as follows.

(a) When a modified styrene-butadiene rubber for silica and/or a modified polybutadiene rubber for silica are/is used, the polymer binds to the OH groups on the silica surface during kneading to improve silica dispersibility and integrate the polymer and the silica. Thus, relationships (1) to (3) are satisfied.

(b) When a sulfur-containing oligomer is used, the oligomer which is highly compatible with the polymer and has a molecular weight close to that of the polymer is incorporated uniformly into the polymer to present elemental sulfur and further a sulfur/promoter/zinc/fatty acid complex, which enable formation of uniform crosslinking between the polymer molecules, thereby resulting in reduced M300. Thus, relationships (1) to (3) are satisfied.

(c) When a highly dispersible resin is used, the resin does not block the diene bonds in the polymer and allows elemental sulfur to come near the diene bonds, thereby resulting in reduced M300. Thus, relationships (1) to (3) are satisfied.

(d) When a rosin resin is used, the COOH moiety of the rosin can adsorb sulfur to deliver elemental sulfur uniformly into the polymer, thereby resulting in reduced M300. Thus, relationships (1) to (3) are satisfied.

(e) When silica is used as a main filler while increasing the filler content, the filler which has an effect of breaking polymer aggregates reduces self-aggregation of the polymer molecules, and the proportions by volume of the polymer and filler become close to each other, thereby resulting in more uniform crosslinking. Thus, relationships (1) to (3) are satisfied.

The rubber composition (vulcanized rubber composition) satisfies the following relationship (1).

$$EB/M300 \geq 50 \qquad (1)$$

When the ratio EB [%]/M300 [MPa] is 50 [%/MPa] or higher, the actual contact area of the tread surface to the road surface tends to increase, resulting in excellent wet grip performance during the initial phase of running. The EB/M300 is preferably 55 or higher, more preferably 70 or higher, still more preferably 75 or higher. The upper limit of the EB/M300 is not limited, but is preferably 300 or lower, more preferably 250 or lower. For general tires with patterns, it is still more preferably 200 or lower.

The rubber composition (vulcanized rubber composition) satisfies the following relationship (2).

$$M100 \geq 1.7 \text{ MPa} \qquad (2)$$

When the M100 is 1.7 MPa or higher, good handling stability, wet grip performance during the initial phase of running, and tensile properties tend to be obtained. The M100 is preferably 2.0 MPa or higher, more preferably 2.2 MPa or higher. The upper limit of the M100 is not limited, but is preferably 4.0 MPa or lower, more preferably 3.5 MPa or lower.

The rubber composition (vulcanized rubber composition) satisfies the following relationship (3).

$$EB \geq 500\% \qquad (3)$$

When the EB is 500% or higher, good cut and chip resistance and crack growth resistance tend to be obtained. The EB is preferably 520% or higher, more preferably 540% or higher, still more preferably 550% or higher. The upper limit of the EB is not limited, but is preferably 1000% or lower, more preferably 800% or lower, still more preferably 700% or lower.

The EB (elongation at break), M300 (300% modulus), and M100 (100% modulus) are determined on vulcanized rubber compositions in accordance with JIS K6251:2010 as described in EXAMPLES.

The diene rubber used in the rubber composition is not limited. Examples include isoprene-based rubbers (e.g., polyisoprene rubber (IR), epoxidized polyisoprene rubber, hydrogenated polyisoprene rubber, grafted polyisoprene rubber, natural rubber (NR), deproteinized natural rubber (DPNR), high purity natural rubber (UPNR), epoxidized natural rubber (ENR), hydrogenated natural rubber (HNR), and grafted natural rubber), styrene-butadiene rubber (SBR), polybutadiene rubber (BR), styrene-isoprene-butadiene rubber (SIBR), chloroprene rubber (CR), and acrylonitrile butadiene rubber (NBR). These may be used alone, or two or more of these may be used in combination. In view of properties such as wet grip performance during the initial phase of running and tensile properties, SBR, BR, and isoprene-based rubbers are preferred among these. It is preferred to use a combination of BR and SBR. Particularly preferred is modified BR and/or modified SBR. These may be used alone, or two or more of these may be used in combination.

The modified BR is preferably a modified low-cis BR for silica. The modified low-cis BR for silica (low-cis BR modified with a compound interactive with silica) may be any low-cis BR modified with a compound having a functional group interactive with silica, preferably a functional group containing at least one atom selected from the group consisting of nitrogen, oxygen and silicon. Examples include chain end-modified low-cis BR prepared by modifying at least one chain end of BR with a compound (modifier) having the functional group, main chain-modified low-cis BR having the functional group in the main chain, and main chain- and chain end-modified low-cis BR having the functional group in both the main chain and chain end (for example, main chain- and chain end-modified low-cis BR in which the main chain has the functional group and at least one chain end is modified with the modifier). Preferred is chain end-modified low-cis BR.

Examples of the functional group include amino, amide, alkoxysilyl, isocyanate, imino, imidazole, urea, ether, carbonyl, oxycarbonyl, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Among these, primary, secondary, or tertiary amino (in particular, glycidyl amino), epoxy, hydroxy, alkoxy (preferably C1-C6 alkoxy), and alkoxysilyl (preferably C1-C6 alkoxysilyl) groups are preferred as they are highly effective for improving fuel economy and wet grip performance.

The chain end-modified low-cis BR is preferably an alkoxysilyl-modified BR (BR modified with an alkoxysilyl group-containing modifier), particularly preferably a low-cis BR modified with a compound represented by the following formula (S-modified low-cis BR):

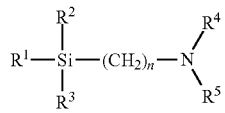

wherein $R^1$, $R^2$, and $R^3$ are the same or different and each represent an alkyl group, an alkoxy group, a silyloxy group, an acetal group, a carboxyl group (—COOH), a mercapto group (—SH), or a derivative thereof; $R^4$ and $R^5$ are the same or different and each represent a hydrogen atom or an alkyl group, and $R^4$ and $R^5$ may be bonded to each other to form a ring structure with the nitrogen atom; and n represents an integer.

Examples of the S-modified low-cis BR include those described in JP 2010-111753 A.

$R^1$, $R^2$, and $R^3$ are each suitably an alkoxy group, preferably a C1-C8, more preferably C1-C4 alkoxy group. $R^4$ and $R^5$ are each suitably an alkyl group, preferably a C1-C3 alkyl group. The symbol n is preferably 1 to 5, more preferably 2 to 4, and still more preferably 3. In the case where $R^4$ and $R^5$ are bonded to each other to form a ring structure with the nitrogen atom, the ring structure is preferably a 4- to 8-membered ring. The term "alkoxy" also includes cycloalkoxy (e.g., cyclohexyloxy) and aryloxy (e.g., phenoxy, benzyloxy).

Specific examples of the compound of the above formula include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these, 3-dimethylaminopropyltrimethoxysilane, 3-dimethylaminopropyltriethoxysilane, and 3-diethylaminopropyltrimethoxysilane are preferred because they can improve the above-mentioned properties well. These may be used alone, or two or more of these may be used in combination.

The modification of polybutadiene rubber with the compound (modifier) of the above formula may be carried out by known methods as described in JP H06-53768 B, JP H06-57767 B, and others. For example, the modification may be accomplished by contacting polybutadiene rubber with the compound. More specifically, it may be carried out by preparing polybutadiene rubber by anionic polymerization, and then adding a predetermined amount of the compound to the rubber solution to react the compound with the polymerizing end (active end) of the polybutadiene rubber.

The chain end-modified low-cis BR is also preferably a low-cis polybutadiene rubber modified with a low molecular weight compound having a glycidylamino group in the molecule. It may suitably be, for example, a low-cis polybutadiene rubber modified with a low molecular weight compound represented by the following formula:

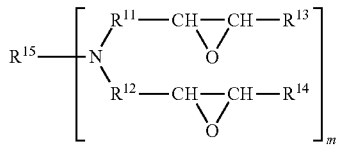

wherein $R^{11}$ and $R^{12}$ are the same or different and each represent a C1-C10 hydrocarbon group that may have at least one selected from the group consisting of ether and tertiary amine groups; $R^{13}$ and $R^{14}$ are the same or different and each represent a hydrogen atom or a C1-C20 hydrocarbon group that may have at least one selected from the group consisting of ether and tertiary amine groups; $R^{15}$ represents a C1-C20 hydrocarbon group that may have at least one selected from the group consisting of ether, tertiary amine, epoxy, carbonyl, and halogen groups; and m represents an integer of 1 to 6.

$R^{11}$ and $R^{12}$ are each preferably a C1-C10, more preferably C1-C3 alkylene group. $R^{13}$ and $R^{14}$ are each preferably a hydrogen atom. Examples of $R^{15}$ include C3-C20, preferably C6-C10, more preferably C8 hydrocarbon groups. Preferred are cycloalkyl or cycloalkylene groups represented by the following formulas, with the cycloalkylene groups being more preferred.

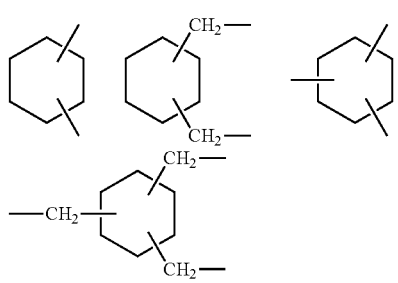

The symbol m is preferably 2 to 3. Suitable examples of the compound of the above formula include tetraglycidylmetaxylenediamine, tetraglycidylaminodiphenylmethane, tetraglycidyl-p-phenylenediamine, diglycidylaminomethylcyclohexane, and tetraglycidyl-1,3-bisaminomethylcyclohexane.

The low-cis polybutadiene rubber modified with a low molecular weight compound having a glycidylamino group in the molecule is more preferably a low-cis polybutadiene rubber modified with a mixture of a low molecular weight compound having a glycidylamino group in the molecule and a dimer or higher oligomer of the low molecular weight compound (A-modified low-cis BR). Examples of the A-modified low-cis BR include those described in JP 2009-275178 A.

The oligomer is preferably a dimer to decamer of the low molecular weight compound. The low molecular weight compound is an organic compound having a molecular weight of 1,000 or less, and may suitably be a compound represented by the following formula:

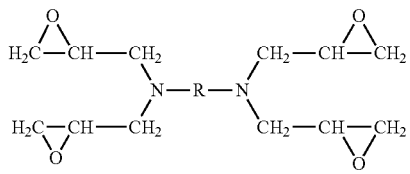

wherein R represents a divalent hydrocarbon group or a divalent organic group containing at least one polar group selected from the group consisting of: oxygen-containing polar groups such as ether, epoxy, and ketone groups; sulfur-containing polar groups such as thioether and thioketone groups; and nitrogen-containing polar groups such as tertiary amino and imino groups. The divalent hydrocarbon group may be a saturated or unsaturated, linear, branched or cyclic group. Examples of the divalent hydrocarbon group include alkylene, alkenylene, and phenylene groups. Specific examples include methylene, ethylene, butylene, cyclohexylene, 1,3-bis(methylene)-cyclohexane, 1,3-bis(ethylene)-cyclohexane, o-phenylene, m-phenylene, p-phenylene, m-xylene, p-xylene, and bis(phenylene)-methane.

Specific examples of the low molecular weight compound of the above formula include tetraglycidyl-1,3-bisaminomethylcyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, and 2-[2-(N,N-diglycidylamino)ethyl]-1-glycidylpyrrolidine. Among these, tetraglycidyl-1,3-bisaminomethylcyclohexane is preferred.

Suitable examples of the oligomer component include dimers represented by the following formula and trimers represented by the following formulas.

The ratio of the low molecular weight compound to the oligomer component in the modifier can be determined by GPC. Specifically, a column which allows for analysis of samples ranging from the low molecular weight compound to the oligomer component is selected and used for analysis. With respect to the measured peaks, a perpendicular line is drawn from the first inflection point on the high molecular weight side of the peak derived from the low molecular weight compound, and then the ratio of the area of the component on the low molecular weight side to the area of the component on the high molecular weight side is determined. This area ratio corresponds to the ratio of the low molecular weight compound to the oligomer component.

The peak on the high molecular weight side from the oligomer component is subjected to integration until the point corresponding to a molecular weight that reaches not more than 10 times the molecular weight of the low molecular weight compound, when determined relative to polystyrene standards, or the point at which the component peak reaches 0 if the component peak reaches 0 before the point corresponding to a molecular weight that reaches not more than 10 times the molecular weight of the low molecular weight compound.

The reaction between the modifier and the polybutadiene having an active end synthesized by anionic polymerization using a polymerization initiator such as a lithium compound can be carried out by allowing the modifier to react with the active end of the polymer. The modification of polybutadiene rubber with the low molecular weight compound having a glycidylamino group in the molecule or a mixture of the compound and an oligomer thereof can be carried out according to the above-mentioned modification method.

The modified low-cis BR for silica preferably has a cis content of 50% by mass or lower, more preferably 45% by mass or lower, still more preferably 40% by mass or lower. When the cis-content is adjusted to 50% by mass or lower, the modifying group for silica tends to be added to the polymer at a higher rate, thereby facilitating interaction with silica. The lower limit of the cis content is not limited, but is preferably 10% by mass or higher, more preferably 20%

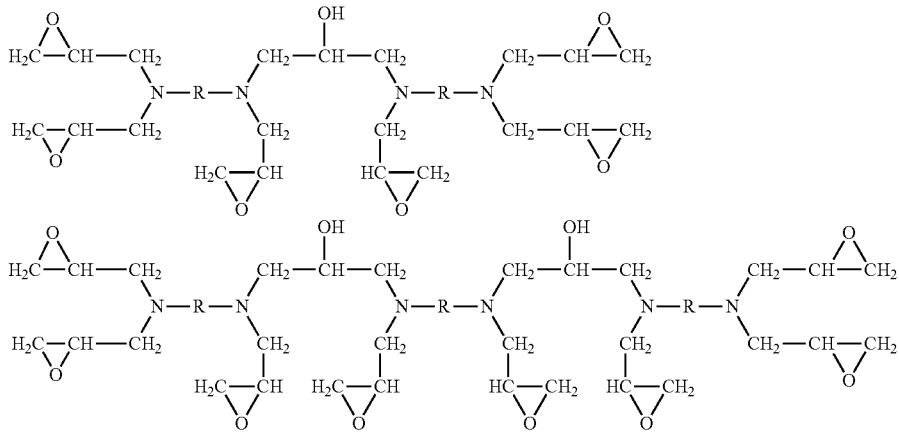

In the case of modification with a mixture of the low molecular weight compound and the oligomer, the modifier (mixture) preferably contains, based on 100% by mass thereof, 75 to 95% by mass of the low molecular weight compound and 25 to 5% by mass of the oligomer.

by mass or higher. When the cis-content is adjusted to 10% by mass or higher, good elongation at break tends to be obtained.

The modified low-cis BR for silica preferably has a vinyl content of 35% by mass or lower, more preferably 30% by mass or lower. When the vinyl content is adjusted to 35% by mass or lower, good elongation at break EB tends to be obtained. The lower limit of the vinyl content is not limited, but is preferably 1% by mass or higher, more preferably 10% by mass or higher.

The modified low-cis BR for silica preferably has a weight average molecular weight (Mw) of 200,000 or more, more preferably 400,000 or more. When the Mw is adjusted to 200,000 or more, good elongation at break tends to be obtained. The Mw is preferably 900,000 or less, more preferably 700,000 or less. When the Mw is adjusted to 900,000 or less, good dispersibility and sufficient elongation at break tend to be obtained.

Herein, the cis content (cis-1,4-butadiene unit content) and vinyl content (1,2-butadiene unit content) of the polymer can be determined by infrared absorption spectrometry. The weight average molecular weight (Mw) and number average molecular weight (Mn) can be measured using a gel permeation chromatograph (GPC) (GPC-8000 series available from Tosoh Corporation, detector: differential refractometer, column: TSKGEL SUPERMULTIPORE HZ-M available from Tosoh Corporation) and calibrated with polystyrene standards.

The amount of the modified low-cis BR for silica based on 100% by mass of the diene rubber is preferably 8% by mass or more, more preferably 10% by mass or more, still more preferably 12% by mass or more. The amount is preferably 40% by mass or less, more preferably 30% by mass or less, still more preferably 25% by mass or less. When the amount is adjusted within the range indicated above, sufficient elongation at break tends to be obtained.

Non-limiting examples of other BR rubbers include those commonly used in the tire industry, such as high-cis BR, e.g., BR1220 available from Zeon Corporation and BR150B available from Ube Industries, Ltd.; BR containing 1,2-syndiotactic polybutadiene crystals (SPB), e.g., VCR412 and VCR 617 both available from Ube Industries, Ltd.; and polybutadiene rubbers synthesized using rare earth catalysts (rare earth-catalyzed BR). Other examples include modified polybutadiene rubbers such as tin-modified polybutadiene rubbers (tin-modified BR (modified BR for carbon black)) which have been modified with tin compounds, e.g., tin-modified BR polymerized using a lithium initiator and having a vinyl bond content of 5 to 50% by mass, an Mw/Mn of 2.0 or less, and a tin atom content of 50 to 3,000 ppm. Rare earth-catalyzed BR is preferred among these.

The term "rare earth-catalyzed BR" refers to a polybutadiene rubber synthesized using a rare earth catalyst and characterized by high cis content and low vinyl content. The rare earth-catalyzed BR may be one commonly used in tire production.

The rare earth catalyst used may be a known one. Examples include catalysts containing lanthanide rare earth compounds, organoaluminum compounds, aluminoxanes, or halogen-containing compounds, optionally together with Lewis bases. Among these, neodymium (Nd) catalysts using Nd-containing compounds as lanthanide rare earth compounds are particularly preferred.

Examples of the lanthanide rare earth compounds include halides, carboxylates, alcoholates, thioalcoholates, and amides of rare earth metals of atomic numbers 57 to 71. Among these, Nd catalysts are preferred because they allow the resulting BR to have a high cis content and a low vinyl content as described above.

Examples of the organoaluminum compounds include compounds represented by the formula: $AlR^aR^bR^c$ wherein $R^a$, $R^b$, and $R^c$ are the same or different and each represent a hydrogen atom or a C1-C8 hydrocarbon group. Examples of the aluminoxanes include acyclic aluminoxanes and cyclic aluminoxanes. Examples of the halogen-containing compounds include aluminum halides represented by the formula: $AlX_kR^d{}_{3-k}$ wherein X represents a halogen atom, $R^d$ represents a C1-C20 alkyl, aryl, or aralkyl group, and k is 1, 1.5, 2, or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases may be used for complexation of lanthanide rare earth compounds, and suitable examples include acetylacetone, ketones, and alcohols.

In the polymerization of butadiene, the rare earth catalyst may be used in solution in an organic solvent (e.g., n-hexane, cyclohexane, n-heptane, toluene, xylene, or benzene) or may be supported on an appropriate carrier, such as silica, magnesia, or magnesium chloride. With regard to the polymerization conditions, the polymerization may be either solution polymerization or bulk polymerization, preferably at a polymerization temperature of −30 to 150° C., and the polymerization pressure may be chosen appropriately depending on other conditions.

The rare earth-catalyzed BR preferably has a ratio of the weight average molecular weight (Mw) to the number average molecular weight (Mn) (Mw/Mn) of 1.2 or higher, more preferably 1.5 or higher. When the ratio is adjusted to the lower limit or higher, good processability tends to be obtained. The Mw/Mn is preferably 5 or lower, more preferably 4 or lower, still more preferably 3 or lower, particularly preferably 2 or lower, most preferably 1.9 or lower. When the Mw/Mn is adjusted to the upper limit or lower, good tensile properties tend to be obtained.

The Mw of the rare earth-catalyzed BR is preferably 200,000 or more, more preferably 250,000 or more, but is preferably 900,000 or less, more preferably 600,000 or less. Moreover, the Mn of the rare earth-catalyzed BR is preferably 100,000 or more, more preferably 150,000 or more, but is preferably 800,000 or less, more preferably 700,000 or less. When the Mw and Mn are each adjusted to the lower limit or more, good tensile properties tend to be obtained. When the Mw and Mn are each adjusted to the upper limit or less, good processability tends to be obtained.

The rare earth-catalyzed BR preferably has a cis content of 90% by mass or higher, more preferably 93% by mass or higher, still more preferably 95% by mass or higher. When the cis content is adjusted to the lower limit or higher, good tensile properties tend to be obtained.

The rare earth-catalyzed BR preferably has a vinyl content of 1.8% by mass or lower, more preferably 1.0% by mass or lower, still more preferably 0.5% by mass or lower, particularly preferably 0.3% by mass or lower. When the vinyl content is adjusted to the upper limit or lower, good tensile properties tend to be obtained.

In the case of the rubber composition containing a rare earth-catalyzed BR, the amount of the rare earth-catalyzed BR based on 100% by mass of the diene rubber is preferably 5% by mass or more, more preferably 10% by mass or more, still more preferably 12% by mass or more. When the amount is adjusted to the lower limit or more, good elongation at break tends to be obtained. The amount is preferably 40% by mass or less, more preferably 35% by mass or less, still more preferably 30% by mass or less. When the amount is adjusted to the upper limit or less, good tensile properties tend to be obtained.

The amount of BR based on 100% by mass of the diene rubber in the rubber composition is preferably 8% by mass or more, more preferably 10% by mass or more, still more preferably 15% by mass or more. When the amount is adjusted to the lower limit or more, good tensile properties tend to be obtained. The amount is preferably 60% by mass or less, more preferably 40% by mass or less, still more preferably 30% by mass or less. When the amount is adjusted to the upper limit or less, good elongation at break EB tends to be obtained.

Any type of SBR may be used, and examples include emulsion-polymerized SBR (E-SBR), solution-polymerized SBR (S-SBR), and modified styrene-butadiene rubber for silica (modified SBR for silica) which has been modified with a compound interactive with silica. Modified SBR for silica is preferred among these.

The modified SBR for silica may be one corresponding to the above-described modified BR for silica whose skeleton component, polybutadiene rubber, is replaced by styrene-butadiene rubber. In particular, the modified SBR for silica is preferably an alkoxysilyl-modified SBR (SBR modified with an alkoxysilyl group-containing modifier), particularly preferably a polybutadiene rubber modified with the compound of the formula mentioned above in connection with the S-modified low-cis BR (S-modified SBR). It is suitable to use an S-modified S-SBR (modified SBR described in JP 2010-111753 A) prepared by modifying the polymerizing end (active end) of a solution-polymerized styrene-butadiene rubber (S-SBR) with the compound of the formula.

The modified SBR for silica preferably has a bound styrene content of 40% by mass or lower, more preferably 35% by mass or lower, still more preferably 30% by mass or lower, but preferably 15% by mass or higher, more preferably 23% by mass or higher.

The styrene content is determined by $H^1$-NMR.

In the case of the rubber composition containing a modified SBR for silica, the amount of the modified SBR for silica based on 100% by mass of the diene rubber is preferably 8% by mass or more, more preferably 15% by mass or more, still more preferably 20% by mass or more. The upper limit of the amount is not limited and may be 100% by mass, but is preferably 80% by mass or less, more preferably 75% by mass or less, still more preferably 72% by mass or less, particularly preferably 70% by mass or less.

The amount of SBR based on 100% by mass of the diene rubber in the rubber composition is 25% by mass or more, preferably 30% by mass or more, more preferably 35% by mass or more. The amount of SBR is 100% by mass or less, preferably 90% by mass or less, more preferably 85% by mass or less.

Any type of silica may be used including, for example, dry silica (anhydrous silica) and wet silica (hydrous silica). Wet silica (hydrous silica) is preferred because it has a large number of silanol groups. Examples of commercially available silica include products of Degussa, Rhodia, Tosoh Silica Corporation, Solvay Japan, and Tokuyama Corporation. These may be used alone, or two or more of these may be used in combination.

The silica preferably has a nitrogen adsorption specific surface area ($N_2SA$) of 80 $m^2/g$ or more, more preferably 115 $m^2/g$ or more, still more preferably 150 $m^2/g$ or more. When the $N_2SA$ is adjusted to the lower limit or more, good grip performance tends to be obtained. The $N_2SA$ is also preferably 400 $m^2/g$ or less, more preferably 270 $m^2/g$ or less, still more preferably 250 $m^2/g$ or less. Silica having a $N_2SA$ of not more than the upper limit tends to disperse well.

The $N_2SA$ of the silica is determined by the BET method in accordance with ASTM D3037-93.

The amount of the silica per 100 parts by mass of the diene rubber in the rubber composition is preferably 50 parts by mass or more, more preferably 80 parts by mass or more, still more preferably 90 parts by mass or more. When the amount is adjusted as above, sufficient reinforcement and good wet grip performance during the initial phase of running tend to be obtained. The upper limit of the amount is not limited, but is preferably 200 parts by mass or less, more preferably 150 parts by mass or less, still more preferably 140 parts by mass or less. When the amount is adjusted to the upper limit or less, the silica tends to disperse better.

The rubber composition containing silica preferably further contains a silane coupling agent.

Any type of silane coupling agent conventionally used with silica in the rubber industry may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Examples of commercially available silane coupling agents include products of Degussa, Momentive, Shin-Etsu Silicone, Tokyo Chemical Industry Co., Ltd., AZmax. Co., and Dow Corning Toray Co., Ltd. These may be used alone, or two or more of these may be used in combination. In view of the balance of the properties, sulfide or mercapto silane coupling agents are preferred among these.

In the rubber composition containing a silane coupling agent, the amount of the silane coupling agent per 100 parts by mass of the silica is preferably 2 parts by mass or more, more preferably 5 parts by mass or more. When the amount is adjusted to the lower limit or more, the added silane coupling agent tends to produce its effect. The amount is also preferably 20 parts by mass or less, more preferably 15 parts by mass or less. When the amount is adjusted to the upper limit or less, an effect commensurate with the added amount tends to be produced, and good processability during kneading tends to be obtained.

The rubber composition may contain other fillers such as carbon black, calcium carbonate, talc, alumina, clay, aluminum hydroxide, and mica. In view of wet grip performance during the initial phase of running and tensile properties, the rubber composition preferably contains carbon black, among others.

Any type of carbon black may be used. Examples include N134, N110, N220, N234, N219, N339, N330, N326, N351, N550, and N762. The carbon black used may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon. These may be used alone, or two or more of these may be used in combination.

The carbon black preferably has a nitrogen adsorption specific surface area ($N_2SA$) of 50 $m^2/g$ or more, more preferably 80 $m^2/g$ or more, still more preferably 100 $m^2/g$ or more. When the $N_2SA$ is not less than the lower limit, good wet grip performance during the initial phase of running tends to be obtained. The $N_2SA$ is also preferably 300 $m^2/g$ or less, more preferably 150 $m^2/g$ or less, still more preferably 130 $m^2/g$ or less. Carbon black having a $N_2SA$ of not more than the upper limit tends to disperse well.

Herein, the DBP absorption of the carbon black is measured in accordance with ASTM D2414-93.

The amount of the carbon black per 100 parts by mass of the diene rubber is preferably 1 part by mass or more, more preferably 3 parts by mass or more. In this case, degradation by UV rays tends to be prevented, and good wet grip performance during the initial phase of running tends to be obtained. The amount is also preferably 30 parts by mass or less, more preferably 25 parts by mass or less, still more preferably 20 parts by mass or less. In this case, good carbon black dispersibility and good wet grip performance tend to be obtained.

In view of wet grip performance during the initial phase of running and tensile properties, the amount of fillers based on 100% by mass of the total rubber composition is preferably 30% by mass or more, more preferably 35% by mass or more, still more preferably 37% by mass or more.

The rubber composition preferably contains a resin to provide good wet grip performance during the initial phase of running.

The resin preferably has a softening point of −10 to 170° C. A resin having a softening point within the range indicated above tends to have good compatibility with the diene rubber. The softening point is more preferably 0° C. or higher, still more preferably 10° C. or higher, but is more preferably 160° C. or lower, still more preferably 150° C. or lower, further preferably 140° C. or lower.

Herein, the softening point is determined in accordance with JIS K 6220:2001 using a ring and ball softening point measuring apparatus and defined as the temperature at which the ball drops down.

The resin preferably has a glass transition temperature (Tg) of −40 to 100° C. A resin having a Tg within the range indicated above tends to have good compatibility with the diene rubber. The glass transition temperature is more preferably −30° C. or higher.

Herein, the Tg can be measured in accordance with JIS K 7121 using a differential scanning calorimeter.

Examples of the resin include aromatic vinyl polymers, coumarone-indene resins, indene resins, rosin resins, terpenic resins, and acrylic resins. Examples of commercially available resins include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., and Toagosei Co., Ltd. These may be used alone, or two or more of these may be used in combination. Among these, aromatic vinyl polymers, coumarone-indene resins, terpenic resins, and rosin resins are preferred.

The aromatic vinyl polymers refer to resins produced by polymerizing α-methylstyrene and/or styrene. Examples include homopolymers of styrene or α-methylstyrene, and copolymers of α-methylstyrene and styrene. Among these, copolymers of α-methylstyrene and styrene are preferred.

The coumarone-indene resins refer to resins that contain coumarone and indene as the primary monomer components forming the skeleton (backbone) of the resins. Examples of monomer components other than coumarone and indene which may be contained in the skeleton include styrene, α-methylstyrene, methylindene, and vinyltoluene.

The indene resins refer to resins that contain indene as the primary monomer component forming the skeleton (backbone) of the resins.

The rosin resins (rosins) can be classified based on whether they are modified or not into non-modified rosins (unmodified rosins) and modified rosins (rosin derivatives). Examples of the non-modified rosins include tall rosins (synonym: tall oil rosins), gum rosins, wood rosins, disproportionated rosins, polymerized rosins, hydrogenated rosins, and other chemically-modified rosins. The modified rosins refers to modified products of non-modified rosins, and examples include rosin esters, unsaturated carboxylic acid-modified rosins, unsaturated carboxylic acid-modified rosin esters, rosin amide compounds, and rosin amine salts.

Rosin resins having a carboxyl content that is not excessively high and an appropriate acid number are preferred. Specifically, the acid number of the rosin resins is usually more than 0 mg KOH/g, but, for example, not more than 200 mg KOH/g, preferably not more than 100 mg KOH/g, more preferably not more than 30 mg KOH/g, still more preferably not more than 10 mg KOH/g.

The acid number can be measured as described later in EXAMPLES. Rosins having an excessively high acid number may be subjected to known esterification processes to reduce their carboxyl content and adjust their acid number to the range indicated above.

Examples of the terpenic resins include polyterpene resins produced by polymerizing terpene compounds; aromatic modified terpene resins produced by polymerizing terpene compounds and aromatic compounds; and hydrogenated products of the foregoing resins.

The polyterpene resins refer to resins produced by polymerizing terpene compounds. The terpene compounds refer to hydrocarbons having a composition represented by $(C_5H_8)_n$ or oxygen-containing derivatives thereof, which have a terpene backbone and are classified into monoterpenes $(C_{10}H_{16})_n$ sesquiterpenes $(C_{15}H_{24})$ diterpenes $(C_{20}H_{32})$, and other terpenes. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the above-listed terpene compounds, such as pinene resins, limonene resins, dipentene resins, and pinene-limonene resins. Among these, pinene resins are preferred because their polymerization reaction is simple, and also because they are made from natural pine resin and thus available at low cost. Pinene resins, which usually contain two isomers, i.e., α-pinene and β-pinene, are classified into β-pinene resins mainly containing β-pinene and α-pinene resins mainly containing α-pinene according to the proportions of the components.

Examples of the aromatic modified terpene resins include terpene phenol resins made from the above-listed terpene compounds and phenolic compounds; and terpene styrene resins made from the above-listed terpene compounds and styrenic compounds. Terpene phenol styrene resins made from the above-listed terpene compounds, phenolic compounds, and styrenic compounds may also be used. Examples of the phenolic compounds include phenol, bisphenol A, cresol, and xylenol. Examples of the styrenic compounds include styrene and α-methylstyrene.

In view of properties such as wet grip performance during the initial phase of running, the amount of the resin per 100 parts by mass of the diene rubber in the rubber composition is preferably 3 parts by mass or more, more preferably 7 parts by mass or more, still more preferably 9 parts by mass or more. In view of properties such as tensile properties, the amount is preferably 50 parts by mass or less, more preferably 40 parts by mass or less, still more preferably 37 parts by mass or less.

The rubber composition may contain an oil. The addition of an oil can improve processability, make tires flexible, and provide good wet grip performance during the initial phase of running.

The oil may be, for example, a process oil, a vegetable fat or oil, or a mixture thereof. Examples of the process oil include paraffinic process oils, aromatic process oils, and naphthenic process oils. Examples of the vegetable fat or oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Examples of commercially available oils include products of Idemitsu Kosan Co., Ltd., Sankyo Yuka Kogyo K.K., JX Energy Corporation, Olisoy, H&R, Hokoku Corporation, Showa Shell Sekiyu K.K., and Fuji Kosan Co., Ltd. These may be used alone, or two or more of these may be used in combination. Among these, aromatic process oils are preferred.

The amount of the oil per 100 parts by mass of the diene rubber in the rubber composition is preferably 1 part by mass or more, more preferably 3 parts by mass or more, but is preferably 40 parts by mass or less, more preferably 30 parts by mass or less. When the amount is adjusted within the range indicated above, good wet grip performance during the initial phase of running and good tensile properties tend to be obtained.

Herein, the amount of the oil includes the amount of the oils contained in oil extended rubbers.

The combined amount of the resin and oil per 100 parts by mass of the diene rubber in the rubber composition is preferably 10 parts by mass or more, more preferably 15 parts by mass or more, but is preferably 60 parts by mass or less, more preferably 50 parts by mass or less. When the amount is adjusted within the range indicated above, wet grip performance during the initial phase of running tends to be improved.

The rubber composition contains sulfur (sulfur vulcanizing agent) and/or a sulfur-containing compound.

Examples of the sulfur include those commonly used in the rubber industry, such as powdered sulfur, precipitated sulfur, colloidal sulfur, insoluble sulfur, highly dispersible sulfur, and soluble sulfur. Examples of commercially available sulfur include products of Tsurumi Chemical Industry Co., Ltd., Karuizawa Sulfur Co., Ltd., Shikoku Chemicals Corporation, Flexsys, Nippon Kanryu Industry Co., Ltd., and Hosoi Chemical Industry Co., Ltd. These may be used alone, or two or more of these may be used in combination.

The amount of the sulfur (sulfur vulcanizing agent) per 100 parts by mass of the diene rubber in the rubber composition is preferably 0.3 parts by mass or more, more preferably 0.6 parts by mass or more. The upper limit of the amount is not limited, but is preferably 5.0 parts by mass or less, more preferably 3.0 parts by mass or less, still more preferably 2.5 parts by mass or less. When the amount is adjusted within the range indicated above, good wet grip performance during the initial phase of running and good tensile properties tend to be obtained.

The sulfur-containing compound may be a crosslinkable compound that contains sulfur. In view of wet grip performance, tensile properties, and tensile properties after aging, it is preferably a sulfur-containing oligomer.

The sulfur-containing oligomer preferably has a weight average molecular weight (Mw) of 4,000 or more, as determined by GPC in chloroform solvent using polystyrene standards. Since the sulfur-containing oligomer having a Mw of 4,000 or more is rubbery, it has extremely high affinity and miscibility with diene rubbers such as SBR and BR, and disperses very well in the diene rubbers. Thus, wet grip performance and tensile properties tend to be improved. The lower limit of the Mw is preferably 8,000 or more, more preferably 10,000 or more. The upper limit of the Mw is not limited, and the molecular weight is difficult to precisely determine due to cleavage of the molecules by the solvent, but it is similar to the molecular weight of SBR or NR, in particular, preferably 2,000,000 or less, more preferably 1,600,000 or less, still more preferably 1,400,000 or less. The upper limit of the Mw may also be 100,000 or less, 80,000 or less, or 50,000 or less.

The Mw refers to an Mw determined by gel permeation chromatography (GPC) in chloroform solvent using polystyrene standards, specifically by the method described later in EXAMPLES.

In view of wet grip performance and tensile properties, the sulfur-containing oligomer preferably contains 10 to 95% by mass of elemental sulfur. The lower limit of the amount of elemental sulfur is more preferably 30% by mass or more, still more preferably 40% by mass or more, particularly preferably 45% by mass or more. The upper limit is more preferably 90% by mass or less, still more preferably 75% by mass or less.

The sulfur-containing oligomer preferably contains a repeating unit represented by the following formula (I):

$$-\text{R-S}_x-\quad\quad\quad\quad (I)$$

wherein R represents a substituted or unsubstituted divalent hydrocarbon group optionally containing a heteroatom, and x on average is 1.0 to 10.0.

The substituted or unsubstituted divalent hydrocarbon group optionally containing a heteroatom as R may be a linear, cyclic, or branched group, particularly preferably a linear group. Non-limiting examples of the heteroatom include oxygen and nitrogen. The carbon number of the divalent hydrocarbon group is preferably 1 or more, more preferably 2 or more, but is preferably 20 or less, more preferably 18 or less, still more preferably 12 or less, particularly preferably 8 or less.

Specific examples of the divalent hydrocarbon group include substituted or unsubstituted C1-C18 alkylene groups, C5-C18 cycloalkylene groups, and C1-C18 alkylene groups containing oxyalkylene groups. Among these, substituted or unsubstituted C1-C18 alkylene groups and substituted or unsubstituted C1-C18 alkylene groups containing oxyalkylene groups are preferred. Non-limiting examples of substituents that may be used for the divalent hydrocarbon group as R include functional groups such as hydroxy, phenyl, and benzyl groups.

Specific examples of the substituted or unsubstituted C1-C18 alkylene groups include substituted or unsubstituted methylene, ethylene, trimethylene, tetramethylene, pentamethylene, hexamethylene, octylene, nonylene, decylene, and 1,2-propylene groups.

Examples of the substituted or unsubstituted C1-C18 alkylene groups containing oxyalkylene groups include alkylene groups containing oxyalkylene groups in which a group represented by $(CH_2CH_2O)_p$, a group represented by $(CH_2)_q$, and a group represented by $(CH_2O)_r$ (where p represents an integer of 1 to 5, q represents an integer of 0 to 2, and r represents an integer of 0 to 2) are bound to one another in any manner. Preferred examples include —$CH_2CH_2OCH_2CH_2$—, —$(CH_2CH_2O)_2CH_2CH_2$—, —$(CH_2CH_2O)_3CH_2CH_2$—, —$(CH_2CH_2O)_4CH_2CH_2$—, —$(CH_2CH_2O)_5CH_2CH_2$—, —$(CH_2CH_2O)_2CH_2$—, and —$CH_2CH_2OCH_2OCH_2CH_2$—.

The average value of x is 1.0 to 10.0, and is preferably 2.0 or more, more preferably 3.0 or more, still more preferably 3.5 or more, but is preferably 6.0 or less, more preferably 5.0 or less, still more preferably 4.5 or less. The average number (n) of repeating units of formula (I) is preferably 10 or more, more preferably 20 or more, still more preferably 35 or more, but is preferably 1,000 or less, more preferably 400 or less, still more preferably 110 or less.

The sulfur-containing oligomer preferably has a polarity parameter SP of 12.5 or less. Such a sulfur-containing oligomer has higher dispersibility in the diene polymer, thereby improving the balance of the properties. The upper limit of the SP value is preferably 12.0 or less, more preferably 11.5 or less. The lower limit is not limited, but is preferably 7.0 or more, more preferably 8.0 or more, still more preferably 9.0 or more, particularly preferably 10.0 or more, most preferably 10.5 or more.

Herein, the polarity parameter SP refers to a solubility parameter calculated by the Hoy method using the structure of the compound used. The Hoy method is described in, for example, K. L. Hoy, "Table of Solubility Parameters", Solvent and Coatings Materials Research and Development Department, Union Carbide Corp. (1985).

The sulfur-containing oligomer is preferably produced by reacting a dihalogen compound represented by the following formula (I-1):

$$H—R—H \qquad (I\text{-}1)$$

wherein each H is the same or different and represents a halogen atom, and R represents a substituted or unsubstituted divalent hydrocarbon group optionally containing a heteroatom, with an alkali metal polysulfide represented by the following formula (I-2):

$$M_2Sx \qquad (I\text{-}2)$$

wherein M represents an alkali metal, and x on average is 1.0 to 10.0.

Examples of the halogen atom as H in formula (I-1) include fluorine, chlorine, bromine, and iodine. Among these, chlorine or bromine is preferred. The substituted or unsubstituted divalent hydrocarbon group optionally containing a heteroatom as R is as described above. The dihalogen compound is preferably 2,2'-dichloroethyl ether (bis(2-chloroethyl)ether).

Examples of the alkali metal as M in formula (I-2) include sodium, potassium, and lithium. The average value of x is as described above.

The sulfur-containing oligomer may be prepared by, for example: (1) a method of reacting a dihalogen compound of formula (I-1) with an alkali metal polysulfide of formula (I-2) in a two-phase system using a mixture of immiscible solvents including a hydrophilic solvent and a hydrophobic solvent; or (2) a method of adding and reacting a dihalogen compound of formula (I-1) to/with a solution of an alkali metal polysulfide of formula (I-2) at a rate that allows the dihalogen compound to react with the alkali metal polysulfide at the interface between them.

In the methods (1) and (2) or other methods, the dihalogen compound and the alkali metal polysulfide react on a 1:1 equivalent basis. The dihalogen compound and the alkali metal polysulfide are preferably reacted at a ratio (dihalogen compound/alkali metal polysulfide) of 0.95:1.0 to 1.0:0.95 (equivalence ratio). The reaction temperature is preferably 50 to 120° C., more preferably 70 to 100° C.

The hydrophilic solvent and hydrophobic solvent (lipophilic solvent) are not limited. Any solvent capable of forming a two-phase reaction system using immiscible solvents may be used. Examples of the hydrophilic solvent include water and alcohols such as methanol, ethanol, ethylene glycol, and diethylene glycol. Examples of the hydrophobic solvent include aromatic hydrocarbons such as toluene, xylene, and benzene; aliphatic hydrocarbons such as pentane and hexane; ethers such as dioxane and dibutyl ether; and esters such as ethyl acetate. These hydrophilic or hydrophobic solvents may be used alone, or two or more of these may be used in combination.

In the method (1), it is preferred to use a solvent including water, ethanol, and toluene. In the method (2), it is preferred to add dropwise a mixture of a dihalogen compound of formula (I-1) and toluene to a mixture of an alkali metal polysulfide of formula (I-2) and a solvent including water and/or ethanol at an appropriate rate, and the solvent used may be changed appropriately depending on the type of dihalogen compound.

The reaction between the dihalogen compound and the alkali metal polysulfide does not necessarily require a catalyst, but a catalyst may be added as needed. Examples of the catalyst include quaternary ammonium salts, phosphonium salts, and crown ethers. Specific examples include $(cH_3)_4N^+Cl^-$, $(CH_3)_4N^+Br^-$, $(C_4H_9)_4N^+Cl^-$, $(C_4H_9)_4N^+Br^-$, $C_{12}H_{25}N^+(CH_3)_3Br^-$, $(C_4H_9)_4P^+Br^-$, $CH_3P^+(C_6H_5)_3I^-$, $C_{16}H_{33}P^+(C_4H_9)_3Br^-$, 15-crown-5, 18-crown-6, and benzo-18-crown-6.

Moreover, the above-mentioned methods may be used to produce (1) a sulfur-containing oligomer having a weight average molecular weight of 4,000 or more, as determined by GPC in chloroform solvent using polystyrene standards, or (2) a sulfur-containing oligomer containing 10 to 95% by mass of elemental sulfur, or (3) a sulfur-containing oligomer containing a repeating unit of formula (I), or (4) a sulfur-containing oligomer having an SP value of 12.5 or less.

The amount of the sulfur-containing oligomer per 100 parts by mass of the diene rubber in the rubber composition is preferably 0.4 parts by mass or more, more preferably 0.6 parts by mass or more. The upper limit of the amount is not limited, but is preferably 10.0 parts by mass or less, more preferably 8.0 parts by mass or less, still more preferably 6.0 parts by mass or less. When the amount is adjusted within the range indicated above, good wet grip performance during the initial phase of running and good tensile properties tend to be obtained.

The combined amount of the sulfur (sulfur vulcanizing agent) and the sulfur-containing oligomer per 100 parts by mass of the diene rubber in the rubber composition is preferably 0.5 parts by mass or more, more preferably 0.7 parts by mass or more. The upper limit of the combined amount is not limited, but is preferably 10.0 parts by mass or less, more preferably 8.0 parts by mass or less, still more preferably 6.0 parts by mass or less. When the combined amount is adjusted within the range indicated above, good wet grip performance during the initial phase of running and good tensile properties tend to be obtained.

The rubber composition may further contain additional crosslinking agents other than the sulfur and sulfur-containing oligomer, such as hybrid crosslinking agents.

In view of wet grip performance during the initial phase of running and tensile properties, the rubber composition preferably contains a vulcanization accelerator.

Any type of vulcanization accelerator may be used because the sulfur-containing oligomer facilitates uniform dispersion of sulfur. Examples of the vulcanization accelerator include thiazole vulcanization accelerators such as 2-mercaptobenzothiazole, di-2-benzothiazolyl disulfide (DM (2,2'-dibenzothiazolyl disulfide)), and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. Sulfenamide or guanidine vulcanization accelerators are preferred among these.

The amount of the vulcanization accelerator per 100 parts by mass of the diene rubber in the rubber composition is preferably 0.5 parts by mass or more, more preferably 0.7 parts by mass or more, but is preferably 10 parts by mass or less, more preferably 7 parts by mass or less.

When the amount is within the range indicated above, good wet grip performance during the initial phase of running and good tensile properties tend to be obtained.

The rubber composition preferably contains a wax. Any type of wax may be used. Examples include petroleum waxes such as paraffin waxes and microcrystalline waxes; naturally-occurring waxes such as plant waxes and animal waxes; and synthetic waxes such as polymers of ethylene, propylene, or other monomers. Examples of commercially available waxes include products of Ouchi Shinko Chemical Industrial Co., Ltd., Nippon Seiro Co., Ltd., and Seiko Chemical Co., Ltd. These may be used alone, or two or more of these may be used in combination. Among these, petroleum waxes are preferred, with paraffin waxes being more preferred.

The amount of the wax per 100 parts by mass of the diene rubber is preferably 0.5 parts by mass or more, more preferably 1 part by mass or more, but is preferably 10 parts by mass or less, more preferably 5 parts by mass or less. When the amount is adjusted within the range indicated above, good wet grip performance during the initial phase of running and good tensile properties tend to be obtained.

The rubber composition preferably contains an antioxidant.

Non-limiting examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)propionate]methane. Examples of commercially available antioxidants include products of Seiko Chemical Co., Ltd., Sumitomo Chemical Co., Ltd., Ouchi Shinko Chemical Industrial Co., Ltd., and Flexsys. These may be used alone, or two or more of these may be used in combination. Among these, p-phenylenediamine antioxidants are preferred, with N-(1,3-dimethylbutyl)-N'-phenyl-p-phenylenediamine being more preferred, because they provide good ozone resistance (ozone cracking resistance), wet grip performance during the initial phase of running, and tensile properties.

The amount of the antioxidant per 100 parts by mass of the diene rubber in the rubber composition is preferably 0.3 parts by mass or more, more preferably 1 part by mass or more, but is preferably 7 parts by mass or less, more preferably 6 parts by mass or less, still more preferably 5 parts by mass or less. When the amount is adjusted within the range indicated above, good wet grip performance during the initial phase of running and good tensile properties tend to be obtained.

The rubber composition preferably contains a fatty acid, particularly stearic acid.

The stearic acid may be a conventional one, and examples include products of NOF Corporation, Kao Corporation, FUJIFILM Wako Pure Chemical Corporation, and Chiba Fatty Acid Co., Ltd.

The amount of the fatty acid per 100 parts by mass of the diene rubber in the rubber composition is preferably 0.5 parts by mass or more, more preferably 1 part by mass or more, but is preferably 10 parts by mass or less, more preferably 5 parts by mass or less. When the amount is adjusted within the range indicated above, good wet grip performance during the initial phase of running and good tensile properties tend to be obtained.

The rubber composition preferably contains zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the diene rubber in the rubber composition is preferably 0.5 parts by mass or more, more preferably 1 part by mass or more, but is preferably 5 parts by mass or less, more preferably 4 parts by mass or less. When the amount is adjusted within the range indicated above, good wet grip performance during the initial phase of running and good tensile properties tend to be obtained.

In addition to the above-mentioned components, the rubber composition may contain other additives commonly used in the tire industry. Examples of such additives include processing aids such as plasticizers and lubricants, and surfactants.

The rubber composition may be prepared by known methods. For example, it may be prepared by kneading the components using a rubber kneading machine such as an open roll mill, a Banbury mixer, or a kneader, and vulcanizing the kneaded mixture.

The kneading conditions are as follows. The kneading temperature in a base kneading step in which the additives other than crosslinking agents (vulcanizing agents) and vulcanization accelerators are kneaded is usually 100 to 180° C., preferably 120 to 170° C. The kneading temperature in a final kneading step in which vulcanizing agents and vulcanization accelerators are kneaded is usually 120° C. or lower, preferably 85 to 110° C. The composition obtained after kneading of vulcanizing agents and vulcanization accelerators is usually vulcanized by, for example, press vulcanization. The vulcanization temperature is usually 140 to 190° C., preferably 150 to 185° C.

The tire (e.g., pneumatic tire) of the present invention can be produced using the rubber composition by usual methods. Specifically, the rubber composition containing the components, before vulcanization, may be extruded into the shape of a component such as a tread (a component that makes a contact with the road surface, such as a monolayer tread or a cap tread of a multilayer tread), and then assembled with other tire components on a tire building machine in a usual manner to build an unvulcanized tire, which may then be heated and pressurized in a vulcanizer to give a tire.

The tire may be used as, for example, a tire for passenger vehicles, large passenger vehicles, large SUVs, heavy load vehicles such as trucks and buses, light trucks, or two-wheel vehicles, or as a racing tire (high performance tire). The tire is particularly suitable as a racing tire.

EXAMPLES

The present invention is specifically described below with reference to, but not limited to, examples.

<Preparation of Chain End Modifier>

A chain end modifier was prepared by putting 20.8 g of 3-(N,N-dimethylamino)propyltrimethoxysilane (AZmax. Co.) in a 250 mL graduated flask in a nitrogen atmosphere, and then adding anhydrous hexane (Kanto Chemical Co., Inc.) to a total volume of 250 mL.

Copolymer Production Example 1

To a sufficiently nitrogen-purged 30 L pressure-proof vessel were added 18 L of cyclohexane (Kanto Chemical Co., Inc.), 2,000 g of butadiene (Takachiho Trading Co., Ltd.), and 53 mmol of diethyl ether (Kanto Chemical Co., Inc.), followed by heating to 60° C. Next, 16.6 mL of butyllithium (Kanto Chemical Co., Inc.) was added and then stirred for three hours. Subsequently, 12 mL of a 0.4 mol/L solution of silicon tetrachloride in hexane was added and stirred for 30 minutes. Thereafter, 13 mL of the chain end modifier was added and stirred for 30 minutes. To the reaction solution was added 2 mL of a solution of 0.2 g of 2,6-tert-butyl-p-cresol (Ouchi Shinko Chemical Industrial Co., Ltd.) in methanol (Kanto Chemical Co., Inc.). The resulting reaction solution was put in a stainless steel vessel containing 18 L of methanol, followed by collecting the aggregates. The aggregates were dried for 24 hours under reduced pressure to give a modified BR.

Copolymer Production Example 2

To a sufficiently nitrogen-purged 30 L pressure-proof vessel were added 18 L of n-hexane, 540 g of styrene (Kanto Chemical Co., Inc.), 1,460 g of butadiene, and 17 mmol of tetramethylethylenediamine, followed by heating to 40° C. Subsequently, 3.5 mL of a 0.4 mol/L solution of silicon tetrachloride in hexane was added and stirred for 30 minutes. Then, 10.5 mL of butyllithium was added, and the mixture was heated to 50° C. and stirred for three hours. Thereafter, 30 mL of the chain end modifier was added and stirred for 30 minutes. To the reaction solution was added 2 mL of a solution of 0.2 g of 2,6-tert-butyl-p-cresol (Ouchi Shinko Chemical Industrial Co., Ltd.) in methanol (Kanto Chemical Co., Inc.). The resulting reaction solution was put in a stainless steel vessel containing 18 L of methanol, followed by collecting the aggregates. The aggregates were dried for 24 hours under reduced pressure to give a modified SBR.

Production Example 1

Synthesis of Sulfur-Containing Oligomer 1 (Rubbery)

A flask completely purged with an inert gas such as nitrogen or argon gas was charged with 104.4 g of a 30% aqueous solution of sodium polysulfide (0.180 mol), 150 g of ion exchanged water, and 150 g of ethanol, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic phase was separated, followed by vacuum concentration and drying at 90° C. to give 27.3 g of a target oligomer.

The sulfur-containing oligomer 1 (rubbery) thus prepared had a Mw of 21,000, an elemental sulfur content of 55% by mass, and an SP value of 11.1 and contained a repeating unit of formula (I) wherein $R=(CH_2)_2O(CH_2)_2$ and $x=4.0$ on average.

Production Example 2

Synthesis of Sulfur-Containing Oligomer 2 (Liquid)

A flask completely purged with an inert gas such as nitrogen or argon gas was charged with 104.4 g of a 30% aqueous solution of sodium polysulfide (0.180 mol), 150 g of ion exchanged water, and further 1.25 g of tetrabutylammonium chloride (TBAB) as a reaction catalyst, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic phase was separated, followed by vacuum concentration and drying at 90° C. to give 25.5 g of a target oligomer.

The sulfur-containing oligomer 2 (liquid) thus prepared had a Mw of 2,670, an elemental sulfur content of 55% by mass, and an SP value of 11.1 and contained a repeating unit of formula (I) wherein $R=(CH_2)_2O(CH_2)_2$ and $x=4.0$ on average.

Production Example 3

Synthesis of Sulfur-Containing Oligomer 3 (Liquid)

A flask completely purged with an inert gas such as nitrogen or argon gas was charged with 104.4 g of a 30% aqueous solution of sodium polysulfide (0.180 mol) and 150 g of ion exchanged water, and they were stirred and heated to 90° C. Thereafter, 25.0 g of bis(2-chloroethyl)ether (0.175 mol) diluted with 100 g of toluene was dropwise added to the mixture over two hours, and the reaction was further continued for three hours at the same temperature. Then, the organic phase was separated, followed by vacuum concentration and drying at 90° C. to give 25.0 g of a target oligomer.

The sulfur-containing oligomer 3 (liquid) thus prepared had a Mw of 1,250, an elemental sulfur content of 55% by mass, and an SP value of 11.1 and contained a repeating unit of formula (I) wherein $R=(CH_2)_2O(CH_2)_2$ and $x=4.0$ on average.

Production Example 3

Synthesis of Sulfur-Containing Oligomer 4 (Rubbery)

A flask completely purged with an inert gas such as nitrogen or argon gas was charged with 104.4 g of a 30% aqueous solution of sodium polysulfide (0.180 mol) and 150 g of ion exchanged water, and they were stirred and heated to 90° C. Thereafter, 27.13 g of 1,6-dichlorohexane (0.175 mol) diluted with 100 g of toluene was dropwise added to the mixture over two hours, and the reaction was further continued for three hours at the same temperature. Then, the organic phase was separated, followed by vacuum concentration and drying at 90° C. to give 28.0 g of a target oligomer.

The sulfur-containing oligomer 4 (rubbery) thus prepared had a Mw of 16,000, an elemental sulfur content of 58% by mass, and an SP value of 11.1 and contained a repeating unit of formula (I) wherein R=—$(CH_2)_5$— and x=4.0 on average.

With regard to the structure of the sulfur-containing oligomer 1 used in the examples, the oligomer seems to be a compound containing a repeating unit represented by the following formula (Chem. X):

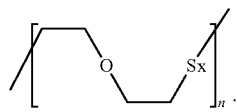
[Chem. X]

(x represents an integer of 1 to 6.)

With regard to the structure of the sulfur-containing oligomers 2 and 3, each oligomer seems to be a mixture of the compound of formula (Chem. X) and/or a compound represented by the following formula (Chem. XI) (a mixture of Chem. X and/or Chem. XI):

[Chem. XI]

(x represents an integer of 1 to 6.)

With regard to the structure of the sulfur-containing oligomer 4, the oligomer seems to be a compound containing a repeating unit represented by the following formula (Chem. XII):

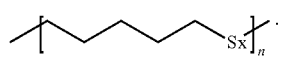
[Chem. XII]

(x represents an integer of 1 to 6.)

The polymers were analyzed as described below.
(Structural Identification)
The structure (styrene content, vinyl content) of the polymers was identified using a JNM-ECA series system available from Jeol Ltd. A solution of 0.1 g of the polymer in 15 mL of toluene was slowly poured into 30 mL of methanol for reprecipitation. The precipitate was dried under reduced pressure and then analyzed.

(Weight Average Molecular Weight (Mw) Measurement)
The weight average molecular weight (Mw) of the polymers was determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

The Mw measurement and structural identification of the sulfur-containing oligomers were performed as described below.
(Weight Average Molecular Weight (Mw), Structural Identification)
The Mw was determined by gel permeation chromatography (GPC) using the apparatus and conditions indicated below and calibrated with polystyrene standards.

Moreover, the fractions corresponding to the peaks in the chromatogram prepared by GPC were separated and then analyzed by gas chromatography-mass spectrometry (GC/MS) to determine the molecular weight of the peak fractions.

The sulfur-containing oligomers were also subjected to $^{13}C$ NMR analysis.

Then, the structure of the sulfur-containing oligomers was identified based on the $^{13}C$ NMR analysis results, the weight average molecular weight determined by GPC, and the molecular weights of the peak fractions determined by GC/MS.

(1) Pretreatment
Each sample was dissolved in a solvent and then filtered through a 0.45 μm membrane filter to prepare a solution for analysis.
(2) Apparatus and Measurement Conditions
Apparatus: GPC-8000 series available from Tosoh Corporation
Column: TSKGel SuperAWM-H×2+SuperAW2500×1 (6.0 mm i.d.×150 mm, 3 columns) available from Tosoh Corporation
Solvent: chloroform
Flow rate: 0.6 mL/min
Detector: RI detector
Column temperature: 40° C.
Injection amount: 20 μL
Molecular weight standards: polystyrene standards
The acid value of the rosin ester resins was measured as described below.

(Acid Value (mg KOH/g) Measurement)
In accordance with JIS K 5902 (2006), 0.5 to 0.7 g of a sample was weighed with an analytical balance and placed in a 100 mL Erlenmeyer flask. The sample was completely dissolved in a neutral solvent (toluene:methanol=2:1) with vigorous shaking. About five drops of 1% phenolphthalein were added to the solution, followed by titration with N/5 KOH to determine the acid value.

The end point of the titration was set at a point where the measurement liquid turned pale red that did not disappear within 30 seconds.

The chemicals used in examples and comparative examples are listed below.

Modified SBR 1 for silica: modified SBR (alkoxysilyl-modified, bound styrene content: 27% by mass, vinyl content: 53 mol %, Mw: 400,000) prepared in Copolymer Production Example 2

Modified SBR 2 for silica: NS616 (non-oil extended, amine-modified, styrene content: 21% by mass, vinyl content: 66% by mass, Mw: 240,000) available from Zeon Corporation High-cis BR 1: BUNA-CB25 (BR synthesized using Nd catalyst, cis content: 96 mol %) available from Lanxess Modified low-cis BR 2 for silica: modified BR (vinyl content: 13% by mass, cis content: 38% by mass, trans content: 50% by mass, Mw/Mn: 1.19, Mw: 420,000) prepared in Copolymer Production Example 1

Carbon black: SHOBLACK N220 ($N_2SA$: 114 $m^2/g$) available from Cabot Japan K.K.

Silica: Ultrasil VN3 ($N_2SA$: 175 $m^2/g$) available from Degussa

Silane coupling agent: Si75 (bis(3-triethoxysilylpropyl) disulfide) available from Evonik Wax: Ozoace 0355 (paraffin wax, melting point: 70° C., normal alkane content: 85% by mass) available from Nippon Seiro Co., Ltd.

Stearic acid: stearic acid "TSUBAKI" available from NOF Corporation

Process oil: Diana Process AH-24 (aromatic process oil) available from Idemitsu Kosan Co., Ltd.

Antioxidant: Antigene 6C (N-(1,3-dimethylbutyl)-N'-phenyl-p-phenylenediamine) available from Sumitomo Chemical Co., Ltd.

Zinc oxide: zinc oxide #2 available from Mitsui Mining & Smelting Co., Ltd.

TO-125: YS resin TO-125 (aromatic modified terpene resin, softening point: 125° C., Tg: 64° C.) available from Yasuhara Chemical Co., Ltd.

T160: YS polystar T160 (terpene phenol resin, softening point: 160° C., Tg: 100° C.) available from Yasuhara Chemical Co., Ltd.

Sylvares 4401: Sylvares 4401 (copolymer of α-methylstyrene and styrene, softening point: 85° C., Tg: 43° C.) available from Arizona Chemical C10: NOVARES C10 (liquid coumarone-indene resin, softening point: 10° C., Tg: −30° C.) available from Rutgers Chemicals Rosin P: HARIESTER P (rosin ester resin, softening point: 102° C., acid value: 9 mg KOH/g) available from Harima Chemicals Group, Inc.

Rosin TF: HARIESTER TF (rosin ester resin, softening point: 80° C., acid value: 10 mg KOH/g) available from Harima Chemicals Group, Inc.

Sulfur-containing oligomer 1: the sulfur-containing oligomer in Production Example 1

Sulfur-containing oligomer 2 (liquid): the sulfur-containing oligomer in Production Example 2

Sulfur-containing oligomer 3 (liquid): the sulfur-containing oligomer in Production Example 3

Sulfur-containing oligomer 4: the sulfur-containing oligomer in Production Example 4

Hybrid crosslinking agent 1: PERKALINK 900 (1,3-bis (citraconimidomethyl)benzene) available from Flexsys Hybrid crosslinking agent 2: Vulcuren VP KA9188 (1,6-bis(N,N'-dibenzylthiocarbamoyldithio)hexane) available from Lanxess Sulfur: 5% oil-containing powder sulfur available from Hosoi Chemical Industry Co., Ltd.

Vulcanization accelerator 1: NOCCELER NS (N-tert-butyl-2-benzothiazolylsulfenamide, melting point: 103° C.) available from Ouchi Shinko Chemical Industrial Co., Ltd.

Vulcanization accelerator 2: NOCCELER D (N,N'-diphenylguanidine, melting point: 145° C.) available from Ouchi Shinko Chemical Industrial Co., Ltd.

EXAMPLES AND COMPARATIVE EXAMPLES

The chemicals other than sulfur and vulcanization accelerators in the amounts indicated in Table 1 were kneaded for five minutes at 150° C. using a 1.7 L Banbury mixer (Kobe Steel, Ltd.) to give a kneaded mixture. To the kneaded mixture were added the sulfur and vulcanization accelerators, and they were kneaded for five minutes at 80° C. using an open roll mill to give an unvulcanized rubber composition. The unvulcanized rubber composition was formed into the shape of a tread and assembled with other tire components to build an unvulcanized tire. The unvulcanized tire was press-vulcanized at 170° C. for 10 minutes to prepare a test tire (size: 195/65R15). For evaluation of rubber specimens, they were cut out of the tread of the test tire.

The test tires and rubber specimens were evaluated as described below. Table 1 shows the results.

(Initial Wet Grip Performance)

The test tires were mounted on a front-engine, rear-wheel-drive car of 2,000 cc displacement made in Japan. A test driver drove the car 10 laps around a test track with wet asphalt conditions and then evaluated control stability during steering on the second lap. The results are expressed as an index (initial wet grip performance index), with Comparative Example 1 taken as 100. A higher index indicates higher initial wet grip performance. Tires with an index of 105 or higher are considered good.

(EB, M300, M100)

In accordance with JIS K6251:2010, No. 6 dumbbell-shaped test pieces were prepared from the rubber specimens cut out of the tread of the test tires, and then subjected to tensile testing at room temperature (25° C.) to determine the elongation at break (EB, %), stress at 300% elongation (M300, MPa), and stress at 100% elongation (M100, MPa).

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Amount (parts by mass) | Modified SBR 1 for silica (alkoxysilyl-modified) | | | | | | | | 80 | 80 | 100 | |
| | Modified SBR 2 for silica (amine-modified) | 80 | 80 | 80 | 80 | 80 | 80 | 80 | | | | 80 |
| | High-cis BR 1 (Nd catalyst) | 20 | 20 | 20 | 20 | 20 | 20 | 20 | 20 | 20 | | |
| | Modified BR for silica (low cis) | | | | | | | | | | | 20 |
| | Carbon black (N220) | 5 | 5 | 5 | 5 | 5 | 5 | 5 | 5 | 5 | 5 | 5 |
| | Silica (VN3) | 75 | 75 | 75 | 75 | 75 | 95 | 115 | 75 | 75 | 75 | 75 |
| | Silane coupling agent (Si75) | 6 | 6 | 6 | 6 | 6 | 7.6 | 9.2 | 6 | 6 | 6 | 6 |

TABLE 1-continued

| | | | | | | | | | | | | |
|---|---|---|---|---|---|---|---|---|---|---|---|---|
| Wax | | 1.5 | 1.5 | 1.5 | 1.5 | 1.5 | 1.5 | 1.5 | 1.5 | 1.5 | 1.5 | 1.5 |
| Stearic acid | | 2 | 2 | 2 | 2 | 2 | 2 | 2 | 2 | 2 | 2 | 2 |
| Process oil | | 17 | 17 | 7 | 7 | | 27 | 17 | 7 | 7 | 7 | 7 |
| Antioxidant | | 2 | 2 | 2 | 2 | 2 | 2 | 2 | 2 | 2 | 2 | 2 |
| Zinc oxide | | 2.5 | 2.5 | 2.5 | 2.5 | 2.5 | 2.5 | 2.5 | 2.5 | 2.5 | 2.5 | 2.5 |
| TO-125 (softening point: 125° C., Tg: 64° C.) | | | | | | 20 | 20 | 20 | | 20 | 20 | 20 |
| T160 (softening point: 160° C., Tg 100° C.) | | | | | | | | | | | | |
| Sylvares 4401 (softening point: 85° C., Tg: 43° C.) | | 10 | 10 | | | | | | | | | |
| C10 (softening point: 10° C., Tg −30° C.) | | | | | | 7 | | | 15 | | | |
| Rosin P (rosin ester resin, acid value: 9) | | | | 20 | | | | | | 20 | | |
| Rosin TF (rosin ester resin, acid value: 10) | | | | | 20 | | | | | | | |
| Sulfur-containing oligomer 1 (sulfur content: 55%, Mw: 21,000) | | 3.0 | | | | | | | | | | |
| Sulfur-containing oligomer 2 (liquid, sulfur content: 55%, Mw: 2,670) | | | 3.0 | | | | | | | | | |
| Sulfur-containing oligomer 3 (liquid, sulfur content: 55%, Mw: 1,250) | | | | | | | | | | | | |
| Sulfur-containing oligomer 4 (sulfur content: 58%, Mw: 16,000) | | | | | | | | | | | | |
| Hybrid crosslinking agent 1 | | | | | | | | | | | | |
| Hybrid crosslinking agent 2 | | | | | | | | | | | | |
| Sulfur | | | | 1.50 | 1.50 | 1.50 | 1.30 | 1.20 | 1.50 | 1.50 | 1.50 | 1.50 |
| Vulcanization accelerator 1 | | 1.7 | 1.7 | 1.7 | 1.7 | 1.7 | 1.7 | 1.7 | 1.7 | 1.7 | 1.7 | 1.7 |
| Vulcanization accelerator 2 | | 2.2 | 2.2 | 2.2 | 2.2 | 2.2 | 2.5 | 2.7 | 2.2 | 2.2 | 2.2 | 2.2 |
| Total amount | | 227.9 | 227.9 | 226.4 | 226.4 | 226.4 | 268.1 | 294.8 | 226.4 | 226.4 | 226.4 | 226.4 |
| Evaluation | Tensile properties M100 | 2.2 | 2.3 | 2.3 | 2.3 | 2.3 | 2.1 | 1.9 | 2.2 | 2.2 | 2.3 | 2.2 |
| | M300 | 7.8 | 8.1 | 9.4 | 9.5 | 8.4 | 7.3 | 6.7 | 8.9 | 9.7 | 8.4 | 8.4 |
| | EB | 615 | 580 | 535 | 530 | 560 | 690 | 675 | 625 | 560 | 585 | 575 |
| | EB/M300 | 79 | 72 | 57 | 56 | 67 | 95 | 101 | 70 | 58 | 70 | 68 |
| | Initial wet grip performance | 113 | 108 | 112 | 109 | 110 | 112 | 113 | 119 | 106 | 109 | 107 |

| | | Example | | | | Comparative Example | | | | | | |
|---|---|---|---|---|---|---|---|---|---|---|---|---|
| | | 12 | 13 | 14 | 15 | 1 | 2 | 3 | 4 | 5 | 6 | 7 |
| Amount (parts by mass) | Modified SBR 1 for silica (alkoxysilyl-modified) | | | | | | | | | | | |
| | Modified SBR 2 for silica (amine-modified) | 80 | 80 | 80 | 80 | 80 | 80 | 80 | 80 | 80 | 80 | 80 |
| | High-cis BR 1 (Nd catalyst) | 20 | 20 | 20 | 20 | 20 | 20 | 20 | 20 | 20 | 20 | 20 |
| | Modified BR for silica (low cis) | | | | | | | | | | | |
| | Carbon black (N220) | 5 | 5 | 5 | 5 | 5 | 5 | 5 | 5 | 5 | 5 | 5 |
| | Silica (VN3) | 75 | 75 | 75 | 75 | 75 | 75 | 75 | 75 | 60 | 60 | 75 |
| | Silane coupling agent (Si75) | 6 | 6 | 6 | 6 | 6 | 6 | 6 | 6 | 4.8 | 4.8 | 6 |
| | Wax | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Process oil | 7 | 17 | 17 | 17 | 17 | 17 | 17 | 17 | 0 | 17 | 30 |
| | Antioxidant | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | TO-125 (softening point: 125° C., Tg: 64° C.) | | | | | | | | | | | |
| | T160 (softening point: 160° C., Tg: 100° C.) | | | | | | | | | 10 | | |
| | Sylvares 4401 (softening point: 85° C., Tg: 43° C.) | 10 | 10 | 10 | 10 | 10 | 10 | 10 | | 10 | 10 | 10 |
| | C10 (softening point: 10° C., Tg −30° C.) | | | | | | | | | | | |

TABLE 1-continued

| | | 1 | 2 | 3 | 4 | 5 | 6 | 7 | 8 | 9 | 10 | 11 |
|---|---|---|---|---|---|---|---|---|---|---|---|---|
| Rosin P (rosin ester resin, acid value: 9) | | 20 | | | | | | | | | | |
| Rosin TF (rosin ester resin, acid value: 10) | | | | | | | | | | | | |
| Sulfur-containing oligomer 1 (sulfur content: 55%, Mw: 21,000) | | 3.0 | 2.4 | | | | | | | | | |
| Sulfur-containing oligomer 2 (liquid, sulfur content: 55%, Mw: 2,670) | | | | | | | | | | | | |
| Sulfur-containing oligomer 3 (liquid, sulfur content: 55%, Mw: 1,250) | | | | 3.0 | | | | | | | | |
| Sulfur-containing oligomer 4 (sulfur content: 58%, Mw: 16,000) | | | | | 3.0 | | | | | | | |
| Hybrid crosslinking agent 1 | | | | | | | | | 2.5 | | | |
| Hybrid crosslinking agent 2 | | | | | | | | 2.5 | | | | |
| Sulfur | | | | | | 1.50 | 0.50 | 1.00 | 1.50 | 1.50 | 1.50 | 1.50 |
| Vulcanization accelerator 1 | | 1.7 | 1.7 | 1.7 | 1.7 | 1.7 | 1.7 | 1.7 | 1.7 | 1.7 | 1.7 | 1.7 |
| Vulcanization accelerator 2 | | 2.2 | 2.2 | 2.2 | 2.2 | 2.2 | 2.2 | 2.2 | 2.2 | 2.2 | 2.2 | 2.2 |
| Total amount | | 237.9 | 227.3 | 227.9 | 227.9 | 226.4 | 227.9 | 228.4 | 226.4 | 193.2 | 210.2 | 239.4 |
| Evaluation | Tensile properties M100 | 2.3 | 1.8 | 2.1 | 2.2 | 2.4 | 2.3 | 2.4 | 2.5 | 2.2 | 1.6 | 1.4 |
| | M300 | 7.8 | 7.6 | 8.0 | 7.9 | 11.7 | 11.5 | 11.4 | 12.5 | 10.2 | 8.3 | 9.8 |
| | EB | 635 | 655 | 595 | 620 | 484 | 500 | 495 | 475 | 450 | 570 | 550 |
| | EB/M300 | 81 | 86 | 74 | 79 | 41 | 43 | 43 | 38 | 44 | 69 | 56 |
| | Initial wet grip performance | 120 | 123 | 109 | 113 | 100 | 100 | 101 | 94 | 87 | 82 | 90 |

As shown in Table 1, the tread rubber compositions containing a diene rubber, silica, and sulfur and/or a sulfur-containing compound, and having predetermined EB/M300, M100, and EB defined by relationships (1) to (3) were excellent in wet grip performance during the initial phase of running. They also had good tensile properties, cut and chip resistance, and handling stability.

A higher silica content tends to result in a higher EB/M300 but is accompanied by a lower M100, so that initial wet grip performance is not much improved (Examples 6 and 7). This is because the amount of the polymer component is reduced, resulting in a lower M100. The sulfur-containing oligomers 1 and 2 and TO-125 have an effect of reducing M300, i.e., promoting uniform crosslinking. Owing to the effect, an EB/M300 of about 70 can be achieved (Examples 1, 2, 5, and 6).

The invention claimed is:

1. A tire comprising a tread formed of a tread rubber composition, the tread rubber composition comprising:
    a diene rubber;
    silica; and
    at least one of sulfur or a sulfur-containing compound,
    the tread rubber composition satisfying the following relationships (1) to (3):

$70 \leq EB/M300 \leq 200$     (1);

$M100 \geq 2.0$ MPa     (2); and $EB \geq 580\%$     (3).

2. The tire according to claim 1,
    wherein the diene rubber comprises at least one of a modified styrene-butadiene rubber or a modified polybutadiene rubber.

3. The tire according to claim 1,
    wherein the diene rubber comprises an alkoxysilyl-modified styrene-butadiene rubber.

4. The tire according to claim 1, comprising at least one of a sulfur-containing oligomer or a rosin resin.

5. A tire comprising a tread formed of a tread rubber composition, comprising:
    a diene rubber;
    silica; and
    at least one of sulfur or a sulfur-containing compound,
    the tread rubber composition satisfying the following relationships (1) to (4):

$EB/M300 \geq 70$     (1);

$M100 \geq 2.0$ MPa     (2);

$EB \geq 580\%$     (3); and $6.7$ MPa $\leq M300 \leq 9.7$ MPa     (4).

6. A tire comprising a tread formed of a tread rubber composition, comprising:
    a diene rubber;
    silica; and
    at least one of sulfur or a sulfur-containing compound,
    the tread rubber composition satisfying the following relationships (1) to (4):

$70 \leq EB/M300 \leq 200$     (1);

$M100 \geq 2.0$ MPa     (2);

$EB \geq 580\%$     (3); and $6.7$ MPa $\leq M300 \leq 9.7$ MPa     (4).

* * * * *